(12) United States Patent
Borneman et al.

(10) Patent No.: US 7,919,420 B2
(45) Date of Patent: *Apr. 5, 2011

(54) LIGHTWEIGHT SPUN-BONDED NONWOVEN FABRIC HAVING SPECIAL BARRIER PROPERTIES

(75) Inventors: Steffen Bornemann, Jessnitz (DE); Markus Haberer, Osnabruck (DE)

(73) Assignee: Fiberweb Corovin GmbH, Peine (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,399

(22) Filed: Mar. 20, 2009

(65) Prior Publication Data

US 2009/0233510 A1    Sep. 17, 2009

Related U.S. Application Data

(63) Continuation of application No. PCT/EP2007/008181, filed on Sep. 20, 2007.

(30) Foreign Application Priority Data

Sep. 21, 2006   (DE) .................. 10 2006 044 495

(51) Int. Cl.
| | |
|---|---|
| *B32B 5/24* | (2006.01) |
| *B32B 5/26* | (2006.01) |
| *B32B 5/30* | (2006.01) |
| *B32B 27/02* | (2006.01) |
| *B32B 27/32* | (2006.01) |
| *B32B 27/12* | (2006.01) |
| *B32B 27/20* | (2006.01) |

(52) U.S. Cl. ........ 442/401; 442/417; 442/381; 442/382; 442/340; 442/341

(58) Field of Classification Search ................ None
See application file for complete search history.

(56) References Cited

U.S. PATENT DOCUMENTS

| | | | | |
|---|---|---|---|---|
| 5,736,465 | A * | 4/1998 | Stahl et al. ................... 442/59 |
| 5,885,909 | A * | 3/1999 | Rudisill et al. ................ 442/82 |
| 6,537,660 | B2 * | 3/2003 | Katayama et al. ............ 428/364 |
| 2003/0124941 | A1 * | 7/2003 | Hwo et al. ................... 442/401 |
| 2004/0116028 | A1 * | 6/2004 | Bryner ........................ 442/381 |
| 2006/0084346 | A1 |   4/2006 | Rollin, Jr. |

FOREIGN PATENT DOCUMENTS

| | | |
|---|---|---|
| EP | 1 657 334 A | 5/2006 |
| WO | WO 94/28219 A | 12/1994 |
| WO | WO 00/44411 | 8/2000 |
| WO | WO 02/16681 A | 2/2002 |

OTHER PUBLICATIONS

International Search Report for PCT/EP2007/008181, filed Mar. 27, 2008.
International Preliminary Report on Patentability and Written Opinion for PCT/EP2007/008181, filed Sep. 20, 2007.

* cited by examiner

*Primary Examiner* — Jennifer A Chriss
(74) *Attorney, Agent, or Firm* — Alston & Bird LLP

(57) ABSTRACT

The invention relates to a spun-bonded nonwoven fabric made of polyolefin filaments having a titer<1.6 dtex, the spun-bonded nonwoven fabric having a basis weight≦18 g/m², a waterproofness of <15 cm measured as a water column, and an air permeability of at least 230 m³/(m²·min), wherein the product of the air permeability and the basis weight is ≦5000 g/(m·min).

22 Claims, 3 Drawing Sheets

Waterproofness measured for spun-bonded nonwoven fabrics having various basis weights.

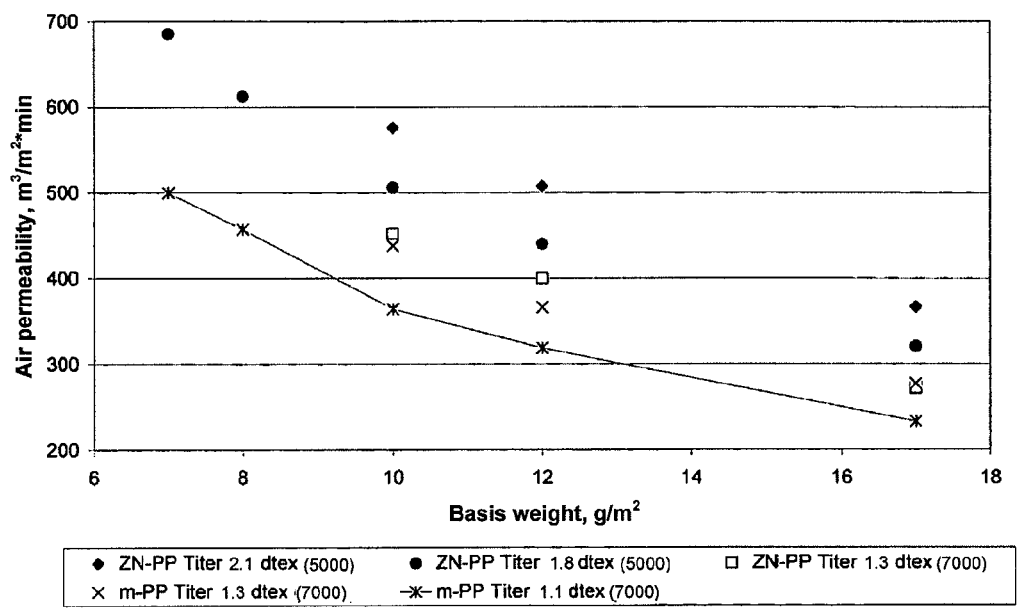
Figure 1: Air permeability measured for spun-bonded nonwoven fabrics having various basis weights.

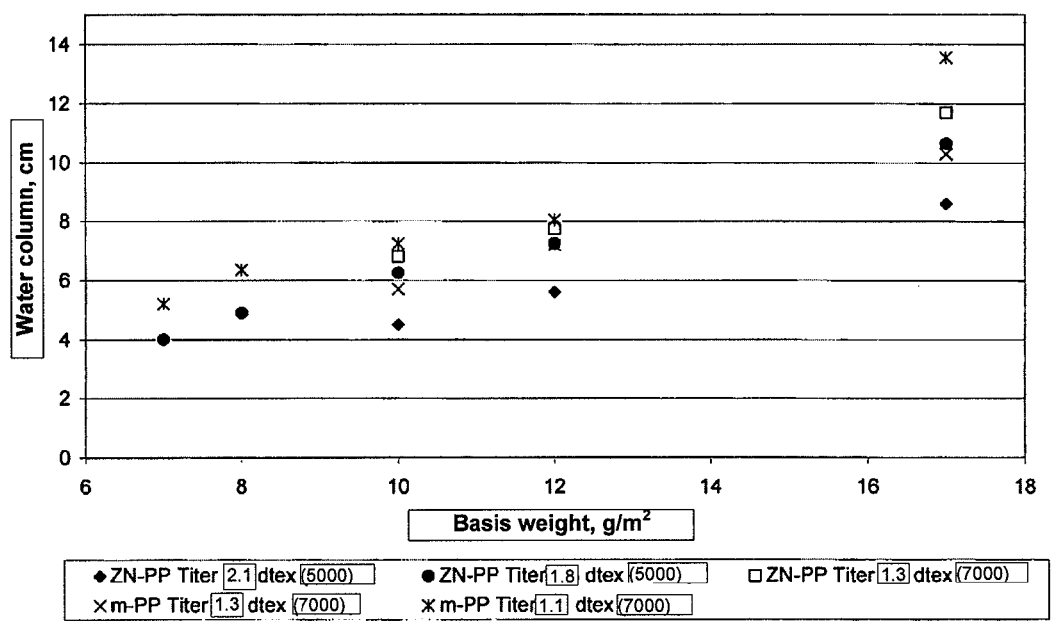
Figure 2: Waterproofness measured for spun-bonded nonwoven fabrics having various basis weights.

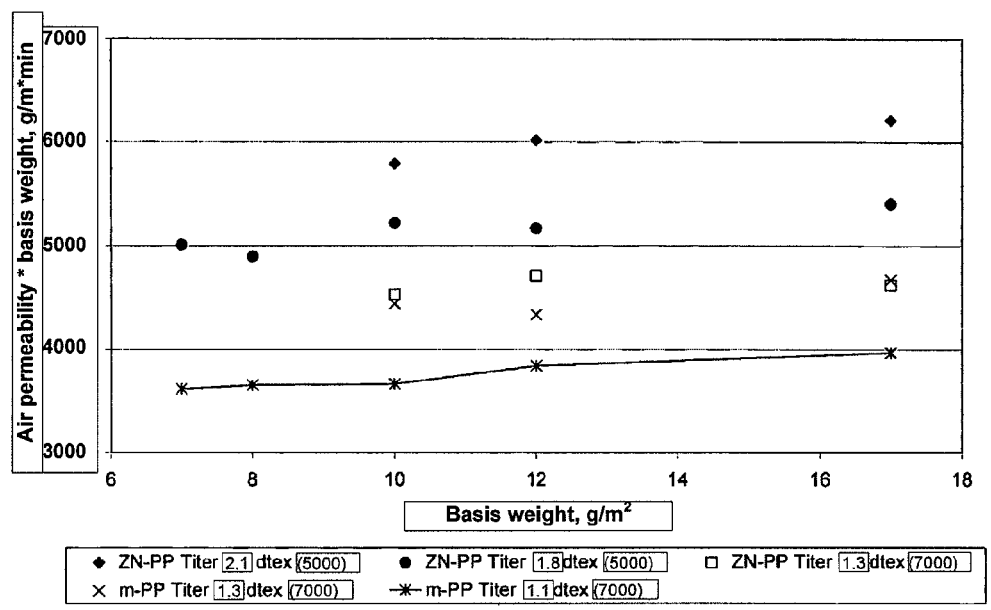
Figure 3: Product of the air permeability and the basis weight, illustrated for spun-bonded nonwoven fabrics having various basis weights.

US 7,919,420 B2

LIGHTWEIGHT SPUN-BONDED NONWOVEN FABRIC HAVING SPECIAL BARRIER PROPERTIES

CROSS REFERENCE TO RELATED APPLICATIONS

This application is a continuation application of International Application No. PCT/EP2007/008181, filed Sep. 20, 2007, published as WO2008/034612 A2, which claims priority from German Application No. 10 2006 044 495.7, filed Sep. 21, 2006.

FIELD AND BACKGROUND OF THE INVENTION

The invention relates to a spun-bonded nonwoven fabric made of polyolefin filaments having a titer<1.6 dtex. The spun-bonded nonwoven fabric is characterized by special barrier properties.

The invention further relates to the manufacture of a laminate using the spun-bonded nonwoven fabric according to the invention, and use of the spun-bonded nonwoven fabric and use of the laminate manufactured using the spun-bonded nonwoven fabric.

Nonwoven fabrics are textile fabrics which may be manufactured in various ways. In addition to wet nonwoven fabric and dry nonwoven fabric manufacture, a distinction is made between melt spinning and melt blowing (melt-blown technology). The two technologies, melt spinning and melt blowing, have the advantage that the plastic granules may be directly converted to the finished fabric using an appropriate manufacturing unit. This is the basis for the comparatively high productivity of these units in nonwoven fabric manufacture.

In melt spinning, polymer granules are melted in an extruder, pressed through the openings (referred to as spinnerets) in a spinning plate, and after cooling are pneumatically or mechanically drawn. The drawing process determines the final strength of the filaments. After drawing, the filaments are deposited loose on a moving laydown belt, and in the region of the contacting intersection points are chemically or thermally bonded to produce so-called interlacing points. With increased bonding, the softness of the nonwoven fabric thus formed decreases and its flexural strength increases. Multiple superposed spun-bonded nonwoven fabric layers which are the same or different may be thermally bonded, for example by calendering, to produce a composite material (laminate).

The productivity is lower for melt blowing than for melt spinning. As a result, the nonwoven fabrics produced by melt blowing (melt-blown technologies) have a lower mechanical load capacity than those produced by melt spinning. In comparison to melt spinning, however, melt blowing is technically more complex and therefore more costly.

The aim of low-cost nonwoven fabric manufacture, therefore, is to replace, or, for laminate manufacturing, to reduce, the nonwoven fabrics produced by melt blowing by nonwoven fabrics which ideally have been produced completely by melt spinning. However, this first requires that the barrier properties of the layers produced by melt spinning be significantly improved.

The barrier properties of a nonwoven fabric are characterized, among other factors, by its air permeability and waterproofness. The measure for the waterproofness is the water pressure, expressed in mbar or in cm of a water column, at which the first water droplets penetrate the test material at the third location on the test surface.

Various other measures are known from the prior art for improving the barrier properties of the nonwoven fabrics produced by melt spinning. In addition to coating the melted spun-bonded nonwoven fabrics and applying films for improving the barrier properties, these measures include above all the use of bicomponent fibers, for example core/sheath fibers or splittable fibers. Coatings or films disadvantageously result in additional raw material and manufacturing costs. The coatings or films may also adversely affect the breathability. The disadvantage of the bicomponent fibers is their high cost.

In addition, increasing the basis weight and using fibers with a greater degree of fineness are known measures for improving the barrier properties of spun-bonded nonwoven fabrics.

U.S. Pat. No. 5,885,909 describes a spun-bonded nonwoven fabric having fibers with a fineness of 1 denier or less and characterized by a Frazier air permeability of at least 70 $m^3/(m^2 \cdot min)$ and a water column of at least 15 cm. The essence of the invention lies in the teaching that the pore size and thus the air permeability and waterproofness of the melt-spun nonwoven fabric produced from the filaments may be influenced by the filament hardness and the fineness of the filaments.

SUMMARY OF THE INVENTION

In light of the above, the object of the present invention is to provide a spun-bonded nonwoven fabric having a low basis weight and improved barrier properties compared to the prior art. The aim is to achieve the highest possible waterproofness while at the same time achieving high air permeability.

A further object of the invention is the manufacture of a composite nonwoven fabric composed of multiple layers, and having barrier properties which usually are ensured only by composite nonwoven fabrics having at least one layer produced by melt blowing.

A further object of the invention is to manufacture the improved spun-bonded nonwoven fabric without loss of productivity.

This object is achieved by processing filaments having a titer≦1.6 dtex to produce a nonwoven fabric having the following properties:

a basis weight≦18 $g/m^2$,
a waterproofness of <15 cm measured as a water column,
an air permeability of at least of at least 230 $m^3/(m^2 \cdot min)$, and
a product of air permeability·basis weight≦5000 $g/(m \cdot min)$.

The essence of the invention is based on the finding that finer filaments allow manufacture of comparatively more lightweight spun-bonded nonwoven fabrics, and also that the barrier properties of a nonwoven fabric depend primarily on the titer of the filaments used. This is attributed to the fact that a larger number of intersection points between filaments having a greater degree of fineness (i.e., lower titer) may be formed after the filaments are laid down, provided that the other parameters for nonwoven fabric manufacture are essentially unchanged. As a result, after chemical bonding of the nonwoven fabric a larger number of binding sites are present, and at the same the pore size of the nonwoven fabric is smaller because of the increased fineness of the filaments. Such spun-bonded nonwoven fabrics have improved waterproofness, but at the same time have high air permeability. This also applies for thermally bonded spun-bonded nonwoven fabrics, as long as the embossing surfaces are dimensioned so that on their own they ensure sufficient bonding of the nonwoven fabric.

The inventors of the nonwoven fabric according to the invention have found that specifically filaments having a titer of 1.6 dtex maximum, in particular in the range of 1.6 dtex to 1.0 dtex, allow the manufacture of nonwoven fabrics whose basis weight is only 4.0 to 18 g/m² and whose barrier properties at the same time represent an optimal value. For production conditions which are otherwise unchanged, the basis weight of a nonwoven fabric also increases with increasing fineness of the filaments due to the increasing nonwoven fabric density; however, with regard to the titer of the filaments a window is apparently provided in which the mechanical properties or barrier properties are improved disproportionately in comparison to the basis weight.

The preferred embodiments of the invention are explained in greater detail below. In one preferred embodiment, the spun-bonded nonwoven fabric has an air permeability in the range of approximately 200 m³/(m²·min) to 550 m³/(m²·min) for a water column in the range of 15 cm to 5 cm. A water column of 5 cm characterizes the lighter-weight spun-bonded nonwoven fabrics having a basis weight of approximately 7 g/m², with a correspondingly high air permeability of approximately 500 m³/(m²·min). In contrast, the heavier spun-bonded nonwoven fabrics having a basis weight of approximately 17 g/m² have a lower air permeability of approximately 230 m³/(m²·min). Spun-bonded nonwoven fabrics having an air permeability greater than 290 m³/(m²·min) are very particularly preferred. According to the invention, such spun-bonded nonwoven fabrics have a basis weight of <15 g/m².

In a further preferred embodiment, the product of the air permeability and the basis weight is ≦4000 g/(m·min). In principle, the air permeability and the basis weight are inversely related; i.e., the higher the basis weight, the lower the air permeability as a rule, although the relationship does not have to be linear. For this reason, as a characterization parameter the product of the air permeability and the basis weight is more meaningful than the air permeability or basis weight data alone (also see FIG. 3).

Particularly preferred are spun-bonded nonwoven fabrics for which the product of the air permeability and the basis weight is in the range of ≦4000 and 3500 g/(m·min). The filament titer of the filaments used to manufacture these nonwoven fabrics is ≦1.1 dtex.

Another important parameter for evaluating the barrier properties of nonwoven fabrics is their waterproofness. The waterproofness is measured as a function of the maximum water column standing above the spun-bonded nonwoven fabric. The measure for the waterproofness is the water pressure, expressed in mbar or in cm of a water column, at which the first water droplets penetrate the test material at the third location on the test surface.

In the measurement of waterproofness the nonwoven fabrics according to the invention exhibit a water column of 5 cm to 15 cm. Thus, for example, one of the nonwoven fabrics according to the invention having a water column of 13.6 cm has a basis weight of only 17 g/m², but at the same time has an air permeability of 233 m³/(m²·min). In the reference (Ref 1; see Table 1, last line) used for the exemplary embodiments of the present patent application, for a water column of 14.0 cm and a basis weight of 17.2 g/m the air permeability is only 188 m³/(m²·min). In addition, the nonwoven fabric known from the prior art (U.S. Pat. No. 5,885,909) has a comparatively high basis weight of greater than 48 g/m² (Example 39) for a comparable water column of 15 cm, whereas the permeability measured according to Frazier is 60 m³/(m²·min).

The quotient of the waterproofness and the basis weight is preferably ≧0.004 m³/g, particularly preferably ≧0.006 m³/g. For spun-bonded nonwoven fabrics having a filament titer≦1.5, in particular ≦1.3 dtex, the quotient of the waterproofness and the basis weight is between 0.006 m³/g and 0.009 m³/g.

The filament titer may be in the range of 1.0 to 1.5 dtex. Filaments of this fineness are preferably obtained using polyolefins, in particular m-polypropylene (m-PP), produced by metallocene catalysis. Surprisingly, it has been found that in this window, the barrier properties of the nonwoven fabric according to the invention advantageously stand out with respect to the barrier properties of known nonwoven fabrics. For a titer≦1.3 dtex, the product of the air permeability and the basis weight is less than 5000 g/(m·min). For a titer≦1.1 dtex, the product of the air permeability and the basis weight is even less than 4000 g/(m·min) (see Tables 1 and 2, and FIG. 3).

The basis weight of the nonwoven fabric according to the invention may be in a range of 4 to 18 g/m². A basis weight between 4 and 15 g/m² or 10 and 15 g/m² is very particularly preferred.

For basis weights of 6 to 18 g/m², it has been demonstrated that the product of the air permeability and the basis weight is between 3500 and 5000 g/(m·min), whereas the quotient of waterproofness/basis weight is ≧0.006 m³/g for this basis weight.

Polyolefin polymers are primarily suited for obtaining such filaments, and thus for manufacturing the nonwoven fabric according to the invention. "Polymers" are macromolecular substances built of simple molecules (monomers) by means of polymerization, polycondensation, or polyaddition. The class of polyolefins includes, among others, polyethylene (HDPE, LDPE, LLDPE, VLDPE; ULDPE, UHMW-PE), polypropylene (PP), poly(1-butene), polyisobutylene, poly (1-pentene), poly(4-methylpent-1-ene), polybutadiene, and polyisoprene, as well as various olefin copolymers. Also included are heterophasic blends of the polyolefins. Thus, for example, polyolefins, in particular polypropylene or polyethylene, graft polymers or copolymers of polyolefins, and α,β-unsaturated carboxylic acids or carboxylic acid anhydrides may be used.

However, the fact that polyolefins are particularly suitable does not exclude the use of polyester, polycarbonate, polysulfone, polyphenylene sulfide, polystyrene, polyamide, or mixtures thereof.

The listing of the starting polymers in the two groups is not exhaustive. Therefore, any other melt-spinnable polymer and its copolymers known to one skilled in the art are not excluded from use for manufacturing the spun-bonded nonwoven fabric.

Polyethylene and polypropylene and their copolymers are particularly suited for manufacturing the spun-bonded nonwoven fabric according to the invention. It is understood as a matter of course that the polyethylene used may be a copolymer mixture of various polyethylenes. The same applies for the polypropylene used.

Polypropylene (m-PP) produced using metallocene catalysts has a more homogeneous molecular weight distribution of the polymeric units and results in small-diameter filaments, even with greatly increased throughput rates. However, polypropylenes obtained by Ziegler-Natta catalysis are also suited for manufacturing the nonwoven fabrics according to the invention.

It is within the scope of the invention to add fillers or pigments to the polymer before extrusion. In principle, any fillers or pigments known to one skilled in the art and suitable for the intended use of the nonwoven fabric may be considered. Solely on the basis of cost, calcium carbonate is a filler of particular interest. Titanium dioxide ($TiO_2$) is also suitable as filler, and is provided for manufacturing the nonwoven fabric according to the invention.

In one particularly preferred embodiment, the filaments may have a filler content of greater than 5% by weight. The average particle size of the filler (D50) is preferably 2 [μ]m to 6 [μ]m, the top cut (D98) of the particles being [≦]10 [μ]m².

The spun-bonded nonwoven fabric may be bonded using any method known to one skilled in the art. The bonding is preferably carried out chemically or thermally. The thickness of the nonwoven fabric is reduced in the region of the embossing points.

The nonwoven fabric thickness of a single bonded spun-bonded nonwoven fabric layer is in the range of 100 to 200 [μ]m. For example, for a nonwoven fabric having a basis weight of 10 g/m², produced using a spinning device having 5000 holes/m (for a spinning beam width of 150 mm), the nonwoven fabric thickness is in the range of approximately 180 [μ]m, for example. For a nonwoven fabric having a basis weight of 10 g/m², produced using a spinning device having 7000 holes/m (for a spinning beam width of 150 mm), the nonwoven fabric thickness is in the range of approximately 150 [μ]m.

The spun-bonded nonwoven fabric according to the invention forms a layer in a laminate composed of at least two spun-bonded nonwoven fabric layers. The second layer or additional layers may have properties which are the same as or greatly different from the spun-bonded nonwoven fabric according to the invention, depending on the need. Solely on the basis of its light weight, the nonwoven fabric according to the invention is suited for a variety of combinations. It is also possible for one or more of the laminate layers to be produced by melt blowing.

The numerous applications for use of the spun-bonded nonwoven fabric also lie within the scope of the invention. The most important applications for the nonwoven fabrics according to the invention are the manufacture of interlining materials, personal hygiene articles (diapers, sanitary napkins, cosmetic pads), polishing and wiping cloths and mop heads, as well as gas and liquid filters, bandages, and compresses. The manufacture of insulation materials, acoustic nonwovens, and roof underlays is also conceivable. Use as geononwovens is also possible. Geononwovens are used, for example, for fastening embankments, for green roofs, as a layer in landfill covers for separating layers of earth and bulk materials, or as an interlayer beneath the roadbed of a paved roadway. The nonwoven fabrics also have beneficial uses as coverings in agriculture and horticulture.

EXAMPLES

The invention is explained in greater detail below with reference to examples and figures. However, the referenced examples are intended only to illustrate the particulars of the invention, and are not to be construed as limiting.

Using "Moplen HP560R" (manufacturer: Basell) polypropylene (PP) produced by Ziegler-Natta catalysis, referred to hereinafter as "ZN-PP," spun-bonded nonwoven fabrics having various basis weights were manufactured by melt spinning in such a way that the filament fineness of filaments laid down for nonwoven fabric formation was set at 1.3 dtex, 1.8 dtex, and 2.1 dtex.

The spun-bonded nonwoven fabrics were manufactured on a "Reicofil 3" spun-bonded nonwoven fabric pilot unit, using a conventional spinning device (spinneret having 5,000 capillaries per meter, width of spinneret surface provided with holes (capillaries): 150 mm, referred to as "standard spinning plate"), and a modified spinning device with an increased number of capillaries per spinneret surface area (7,000 capillaries per meter, width of spinneret surface provided with capillaries: 150 mm, referred to as "alternative spinning plate" or as "7000" for short).

The nonwoven fabric samples produced according to the prior art, using the standard spinning plate, are referred to as "ZN-PP S1" through "ZN-PP S8." The composition, process conditions, and characteristic properties are shown in Table 1.

In addition, typical properties of a commercially available composite nonwoven fabric (SMS) provided by the Corovin C4 production facility (Corovin GmbH, Peine), the reference designated as "Ref 1," are listed as comparative data in Table 1.

The samples according to the invention which were manufactured using the alternative spinning plate having an increased number of openings (capillaries) per surface area are referred to as samples "ZN-PP A1" through "ZN-PP A3." The composition, process conditions, and characteristic properties are shown in Table 2.

In addition, the alternative spinning plate was used to manufacture spun-bonded nonwoven fabrics, having various basis weights, from a PP with the trade name "Metocene HM562S" (manufacturer: Basell) produced by metallocene catalysis, referred to as "m-PP." The filament titer of the filaments forming the spun-bonded nonwoven fabrics was set at 1.3 dtex and 1.1 dtex.

The corresponding samples are referred to as "m-PP A1" through "m-PP A8." The composition, process conditions, and characteristic properties are likewise shown in Table 2. The basis weights of the manufactured spun-bonded nonwoven fabrics were varied from 7 g/m² to 17 g/m².

Further melt additives or pigments, such as titanium dioxide, for example, were not added in the examples described here, although it is provided according to the invention that melt additives and/or pigments may be added to the polymer or polymer mixture before extrusion.

BRIEF DESCRIPTION OF THE DRAWINGS

FIG. 1 illustrates the air permeability of spun-bonded nonwoven fabrics having various basis weights.

FIG. 2 shows the waterproofness of the spun-bonded nonwoven fabrics having various basis weights.

FIG. 3 illustrates the product of the air permeability and the basis weight for spun-bonded nonwoven fabrics having various basis weights.

The properties of the illustrated spun-bonded nonwoven fabrics are subdivided as follows:

| Illustration in the figures | PP type | Capillary thickness of spinneret (per meter)* | Filament fineness (dtex) |
|---|---|---|---|
| ◆ ZN-PP titer 2.1 dtex (5000) | Ziegler-Natta | 5000 | 2.1 |
| ● ZN-PP titer 1.8 dtex (5000) | PP | | 1.8 |
| □ ZN-PP titer 1.3 dtex (7000) | Metallocene PP | 7000 | 1.3 |
| X m-PP titer 1.3 dtex (7000) | | | 1.3 |
| * m-PP titer 1.1 dtex (7000) | | | 1.1 |

EXPLANATION OF SYMBOLS IN THE FIGURES

FIGS. 1 and 2 show that decreasing the filament titer tends to improve the barrier properties. This is clearly demonstrated for samples ZN-PP S1 through ZN-PP S3 or ZN-PP S4 through ZN-PP S8. A decrease from 2.1 dtex to 1.8 dtex in the filament titer of the threads forming the spun-bonded nonwoven fabrics results in an approximately 15% reduction in the air permeability. Likewise, for a given basis weight the waterproofness increased by approximately 2 cm. However, the finer filaments were obtainable only by reducing the mass throughput of polymer melt by approximately 30%.

However, a comparison of the results of the ZN-PP S1 samples with those of the commercial SMS comparative sample of the same basis weight (Ref 1) shows that the latter sample has much better barrier properties, the difference most likely being attributable to the proportion of the spun-bonded nonwoven fabric layers manufactured by melt blowing (melt-blown) present in the SMS.

Using the alternative spinning plate, spun-bonded nonwoven fabric samples ZN-PP A1 through ZN-PP A3 were manufactured from the PP produced by Ziegler-Natta catalysis. Less polymer melt is transported through the individual capillaries due to the increased number of capillaries for a comparable spinning plate surface area. For a given overall throughput of 189 kg/h*m, the mass throughput was 0.45 g/hole*min, whereas when the conventional spinning device was used the mass throughput was approximately 40% greater (0.63 g/hole*min). Under otherwise comparable process conditions, the reduction in mass throughput (per hole) results in significantly finer fibers. This is accompanied by an improvement in the barrier properties of the spun-bonded nonwoven fabrics.

Thus, spun-bonded nonwoven fabrics are obtained in which the air permeability is approximately 25% less than that achievable using the conventional spinning device at the same overall throughput. Likewise, an increase of approximately 40% was determined for the waterproofness.

The properties of samples ZN-PP A1 through ZN-PP A3 were also demonstrated using a PP produced by metallocene catalysis (see samples m-PP A1 through m-PP A3).

Retesting of the reported results, using the SMS comparative sample with the same basis weight (Ref 1), showed that the barrier properties of the spun-bonded nonwoven fabrics according to the invention more closely approached those of the SMS. However, the SMS still had an approximately ⅓ lower air permeability and a 30% higher waterproofness.

For this reason, further studies for improving the barrier properties of the spun-bonded nonwoven fabrics were conducted.

Samples m-PP A4 through m-PP A8 were produced in such a way that the fibers forming the spun-bonded nonwoven fabrics had a filament titer of approximately 1.1 dtex. From a process engineering standpoint this was achieved by reducing the mass throughput to approximately 0.3 g/hole*min.

Due to the improved spinning reliability it was possible to achieve this filament fineness using only the PP produced by metallocene catalysis. As shown in Table 2 and FIGS. 1 and 2, the manufactured spun-bonded nonwoven fabrics once again showed significantly improved barrier properties.

The barrier properties of sample m-PP A4 are essentially comparable to those of the SMS comparative sample for the same basis weight (Ref 1). In particular for waterproofness, the same values of approximately 14 cm water column were obtained.

In principle, a higher basis weight results in a lower air permeability. Therefore, the two properties cannot be independently evaluated. The air permeability (AP) and basis weight (BW) were multiplied together for purposes of better comparison.

| Raw material | Spinning device | Titer | AP * BW (g/m * min) |
|---|---|---|---|
| ZN-PP | Standard | 2.1 dtex | approx. 6000 |
| ZN-PP | Standard | 1.8 dtex | approx. 5000 |
| ZN-PP | Alternative | 1.3 dtex | <5000 |
| m-PP | Alternative | 1.3 dtex | <5000 |
| m-PP | Alternative | 1.1 dtex | <4000 |

The calculated values are graphically illustrated in FIG. 3. It is shown that spun-bonded nonwoven fabrics having the properties listed below can be productively manufactured only using the method according to the invention: waterproofness≧0.006×basis weight (BW); air permeability (AP)×basis weight (BW)≦5000, preferably ≦4000; and filament titer≦1.3 dtex, preferably ≦1.1 dtex.

This demonstrates that, using the method provided according to the invention, spun-bonded nonwoven fabrics may be manufactured with high productivity, having barrier properties which otherwise would be limited to composite nonwoven fabrics having one or more spun-bonded nonwoven fabric layers produced by melt blowing.

Methods for Determining the Properties of the Spun-Bonded Nonwoven Fabrics

The following methods were used for determining the properties of the spun-bonded nonwoven fabric according to the invention:

Filament Titer/Basis Weight/Spun-Bonded Nonwoven Fabric Thickness

The filament titer was determined by microscope. The measured filament titer (in micrometers) was converted to decitex according to the following formula (PP density=0.91 g/cm$^3$):

$$\left(\frac{Titer_{\mu m}}{2}\right)^2 \cdot \pi \cdot \rho\left[\frac{g}{cm^3}\right] \cdot 0.01 = Titer_{dtex}\left[\frac{g}{10^4 \, m}\right]$$

The basis weight of the spun-bonded nonwoven fabrics was determined according to DIN EN 29073-1 on 10×10 cm test pieces.

The thickness of the spun-bonded nonwoven fabrics was measured as the distance between two plane-parallel measured surfaces, between which the spun-bonded nonwoven fabrics were under a predetermined measurement pressure. The method was carried out analogously to DIN EN ISO 9073-2, using a bearing weight of 125 g, a measurement area of 25 cm$^2$, and a measurement pressure of 5 g/cm$^2$.

Air Permeability

The air permeability of the spun-bonded nonwoven fabrics was measured according to DIN EN ISO 9237. The area of the measuring head was 20 cm$^2$, and the applied test pressure was 200 Pa.

Water Column

The waterproofness was determined according to DIN EN 20811. The test pressure gradient was 10 mbar/min. The measure for the waterproofness was the water pressure, expressed in mbar or in cm of a water column, at which the first water droplets penetrated the test material at the third location on the test surface.

TABLE 1

Composition, process conditions, and characteristic properties of spun-bonded nonwoven fabrics and composite nonwoven fabrics corresponding to the prior art.

| Sample | PP type, configuration | Extruder head temperature °C. | Nozzle temperature °C. | Throughput kg/hm | Filament titer dtex | Basis weight g/m² | Water column cm | Water column/ basis weight m³/g | Air permeability m³/m² min | Air permeability * basis weight m³/m² min |
|---|---|---|---|---|---|---|---|---|---|---|
| ZN-PP S1 | ZN-PP, Standard spinneret | 245 | 250 | 189 | 2.2 | 16.9 | 8.6 | 0.005 | 366 | 6.211 |
| ZN-PP S2 | ZN-PP, Standard spinneret | 245 | 250 | 189 | 2.1 | 11.9 | 5.6 | 0.005 | 508 | 6.017 |
| ZN-PP S3 | ZN-PP, Standard spinneret | 245 | 250 | 189 | 2.1 | 10.1 | 4.5 | 0.004 | 576 | 5.787 |
| ZN-PP S4 | ZN-PP, Standard spinneret | 245 | 250 | 134 | 1.7 | 16.9 | 10.7 | 0.006 | 320 | 5.404 |
| ZN-PP S5 | ZN-PP, Standard spinneret | 245 | 250 | 134 | 1.8 | 11.7 | 7.3 | 0.006 | 440 | 5.166 |
| ZN-PP S6 | ZN-PP, Standard spinneret | 245 | 250 | 134 | 1.8 | 10.3 | 6.3 | 0.006 | 506 | 5.219 |
| ZN-PP S7 | ZN-PP, Standard spinneret | 245 | 250 | 134 | 1.8 | 8.0 | 4.9 | 0.006 | 613 | 4.893 |
| ZN-PP S8 | ZN-PP, Standard spinneret | 245 | 250 | 134 | 1.8 | 7.3 | 4.0 | 0.005 | 685 | 5.005 |
| Ref 1 | SMS (Reicofil 3) | — | — | — | 2.0 | 17.2 | 14.0 | 0.008 | 188 | 3.234 |

TABLE 2

Composition, process conditions, and characteristic properties of spun-bonded nonwoven fabrics corresponding to the invention.

| Sample | PP type, configuration | Extruder head temperature °C. | Nozzle temperature °C. | Throughput kg/hm | Filament titer dtex | Basis weight g/m² | Water column cm | Water column/ basis weight m³/g | Air permeability m³/m² min | Air permeability * basis weight m³/m² min |
|---|---|---|---|---|---|---|---|---|---|---|
| ZN-PP A1 | ZN-PP, Alternative spinneret | 245 | 250 | 189 | 1.5 | 17.0 | 11.7 | 0.007 | 272 | 4.621 |
| ZN-PP A2 | ZN-PP, Alternative spinneret | 245 | 250 | 189 | 1.3 | 11.8 | 7.8 | 0.007 | 400 | 4.709 |
| ZN-PP A3 | ZN-PP, Alternative spinneret | 245 | 250 | 189 | 1.3 | 10.0 | 6.8 | 0.007 | 452 | 4.526 |
| m-PP A1 | m-PP (30), Alternative spinneret | 245 | 250 | 189 | 1.3 | 16.8 | 10.3 | 0.006 | 277 | 4.669 |
| m-PP A2 | m-PP (30), Alternative spinneret | 245 | 250 | 189 | 1.3 | 11.8 | 7.2 | 0.006 | 366 | 4.334 |
| m-PP A3 | m-PP (30), Alternative spinneret | 245 | 250 | 189 | 1.3 | 10.1 | 5.7 | 0.006 | 438 | 4.438 |
| m-PP A4 | m-PP (30), Alternative spinneret | 245 | 250 | 134 | 1.1 | 17.0 | 13.6 | 0.008 | 233 | 3.968 |
| m-PP A5 | m-PP (30), Alternative spinneret | 245 | 250 | 134 | 1.1 | 12.1 | 8.1 | 0.007 | 319 | 3.840 |
| m-PP A6 | m-PP (30), Alternative spinneret | 245 | 250 | 134 | 1.1 | 10.1 | 7.3 | 0.007 | 364 | 3.665 |
| m-PP A7 | m-PP (30), Alternative spinneret | 245 | 250 | 134 | 1.1 | 8.0 | 6.4 | 0.008 | 457 | 3.653 |
| m-PP A8 | m-PP (30), Alternative spinneret | 245 | 250 | 134 | 1.0 | 7.2 | 5.2 | 0.007 | 500 | 3.617 |

That which is claimed is:

1. Spun-bonded nonwoven fabric made of polyolefin filaments having a titer 1.6 dtex, wherein the spun-bonded nonwoven fabric
   has a basis weight 18 g/m$^2$,
   has a waterproofness of 5 cm to 15 cm measured as a water column,
   has an air permeability of at least 230 m$^3$/(m$^2$·min), and
   the air permeability, basis weight product is 5000 g/(m·min), and the waterproofness/basis weight quotient is >0.004 m$^3$/g.

2. Spun-bonded nonwoven fabric according to claim 1, wherein the spun-bonded nonwoven fabric has an air permeability in the range of approximately 230 m$^3$/(m$^2$·min) to 550 m$^3$/(m$^2$·min).

3. Spun-bonded nonwoven fabric according to claim 1, wherein the air permeability basis weight product is ≦4000 g/(m·min).

4. Spun-bonded nonwoven fabric according to claim 1, wherein the air permeability basis weight product is in the range between 3500 to ≦4000 g/(m·min).

5. Spun-bonded nonwoven fabric according to claim 1, wherein for the spun-bonded nonwoven fabric the waterproofness/basis weight quotient is ≧0.006 m$^3$/g.

6. Spun-bonded nonwoven fabric according to claim 1, wherein the filaments have a titer in the range of 1.0 to 1.5 dtex.

7. Spun-bonded nonwoven fabric according to claim 1, wherein the spun-bonded nonwoven fabric has a basis weight of 4 to 18 g/m$^2$.

8. Spun-bonded nonwoven fabric according to claim 1, wherein for basis weights between 6 and 18 g/m$^2$ the product of the air permeability and the basis weight has a value between 3500 and 5000 g/(m·min).

9. Spun-bonded nonwoven fabric according to claim 8, wherein for basis weights between 6 and 18 g/m$^2$ the spun-bonded nonwoven fabric has a waterproofness/basis weight quotient of ≧0.006 m$^3$/g.

10. Spun-bonded nonwoven fabric according to claim 1, wherein the spun-bonded nonwoven fabric has a basis weight of 4 to 13 g/m$^2$.

11. Spun-bonded nonwoven fabric according to claim 1, wherein the polyolefin filaments are composed of polypropylene or polyethylene or a mixture of the two.

12. Spun-bonded nonwoven fabric according to claim 11, wherein the polyolefin filaments are composed of an olefin copolymer.

13. Spun-bonded nonwoven fabric according to claim 1, wherein the polyolefin filaments are composed of a polyolefin produced by Ziegler-Natta catalysis (ZN polyolefin) or a polyolefin produced by metallocene catalysis (m-polyolefin), or a copolymer of the two.

14. Spun-bonded nonwoven fabric according to claim 13, wherein the waterproofness measured as a water column for a polyolefin produced by Ziegler-Natta catalysis (ZN polyolefin) is 6.8 to 11.7 cm.

15. Spun-bonded nonwoven fabric according to claim 13, wherein the waterproofness measured as a water column for a polyolefin produced by metallocene catalysis (m-polyolefin) is 5.2 to 13.6 cm.

16. Spun-bonded nonwoven fabric according to claim 1, wherein the polyolefin filaments contain a filler or a pigment.

17. Spun-bonded nonwoven fabric according to claim 16, wherein the filler is calcium carbonate and the filler content relative to the polymer filament is >5% by weight.

18. Spun-bonded nonwoven fabric according to claim 16, wherein the top cut of the filler particles (D98) is ≦10 μm, and the average particle size of the filler (D50) is approximately 2 μm to approximately 6 μm.

19. Spun-bonded nonwoven fabric according to claim 1, wherein the filaments produced in the melt spinning process and laid down to form a nonwoven fabric are thermally and/or chemically bonded.

20. Laminate composed of at least two spun-bonded nonwoven fabric layers, at least one layer being composed of a lightweight spun-bonded nonwoven fabric according to claim 1.

21. Laminate composed of at least two nonwoven fabric layers, wherein the laminate has at least one nonwoven fabric layer produced by melt blowing, and at least one of the nonwoven fabric layers produced by melt spinning corresponds to a spun-bonded nonwoven fabric according to claim 1.

22. An article of manufacture comprising a spun-bonded nonwoven fabric according to claim 1, said article of manufacture being selected from the group consisting of:
   personal hygiene articles,
   polishing cloths, wiping cloths, and mop heads,
   filters for gases, aerosols, and liquids,
   bandages and compresses,
   insulation materials and acoustic nonwovens,
   interlining materials,
   roof underlays,
   geononwovens, and
   coverings for agriculture and horticulture.

* * * * *

UNITED STATES PATENT AND TRADEMARK OFFICE
CERTIFICATE OF CORRECTION

PATENT NO. : 7,919,420 B2
APPLICATION NO. : 12/408399
DATED : April 5, 2011
INVENTOR(S) : Bornemann et al.

It is certified that error appears in the above-identified patent and that said Letters Patent is hereby corrected as shown below:

Columns 9 and 10,
"TABLE 1" and "TABLE 2" should be deleted and substituted with the attached "TABLE 1" and "TABLE 2".

Table 1. Composition, process conditions, and characteristic properties of spun-bonded nonwoven fabrics and composite nonwoven fabrics corresponding to the prior art.

| Sample | PP type, configuration | Extruder head temperature °C | Nozzle temperature °C | Throughput kg/hm | Filament titer dtex | Basis weight g/m² | Water column cm | Water column/ basis weight m³/g | Air permeability m³/m² min | Air permeability * basis weight m³/m² min |
|---|---|---|---|---|---|---|---|---|---|---|
| ZN-PP S1 | ZN-PP, Standard spinneret | 245 | 250 | 189 | 2.2 | 16.9 | 8.6 | 0.005 | 366 | 6,211 |
| ZN-PP S2 | ZN-PP, Standard spinneret | 245 | 250 | 189 | 2.1 | 11.9 | 5.6 | 0.005 | 508 | 6,017 |
| ZN-PP S3 | ZN-PP, Standard spinneret | 245 | 250 | 189 | 2.1 | 10.1 | 4.5 | 0.004 | 576 | 5,787 |
| ZN-PP S4 | ZN-PP, Standard spinneret | 245 | 250 | 134 | 1.7 | 16.9 | 10.7 | 0.006 | 320 | 5,404 |
| ZN-PP S5 | ZN-PP, Standard spinneret | 245 | 250 | 134 | 1.8 | 11.7 | 7.3 | 0.006 | 440 | 5,166 |
| ZN-PP S6 | ZN-PP, Standard spinneret | 245 | 250 | 134 | 1.8 | 10.3 | 6.3 | 0.006 | 506 | 5,219 |
| ZN-PP S7 | ZN-PP, Standard spinneret | 245 | 250 | 134 | 1.8 | 8.0 | 4.9 | 0.006 | 613 | 4,893 |
| ZN-PP S8 | ZN-PP, Standard spinneret | 245 | 250 | 134 | 1.8 | 7.3 | 4.0 | 0.005 | 685 | 5,005 |
| Ref 1 | SMS (Reicofil 3) | - | - | - | 2.0 | 17.2 | 14.0 | 0.008 | 188 | 3,234 |

Signed and Sealed this
Seventh Day of February, 2012

David J. Kappos
*Director of the United States Patent and Trademark Office*

Table 2. Composition, process conditions, and characteristic properties of spun-bonded nonwoven fabrics corresponding to the invention.

| Sample | PP type, configuration | Extruder head temperature °C | Nozzle temperature °C | Throughput kg/h m | Filament titer dtex | Basis weight g/m² | Water column cm | Water column/ basis weight m³/g | Air permeability m³/m² min | Air permeability * basis weight m³/m² min |
|---|---|---|---|---|---|---|---|---|---|---|
| ZN-PP A1 | ZN-PP, Alternative spinneret | 245 | 250 | 189 | 1.5 | 17.0 | 11.7 | 0.007 | 272 | 4,621 |
| ZN-PP A2 | ZN-PP, Alternative spinneret | 245 | 250 | 189 | 1.3 | 11.8 | 7.8 | 0.007 | 400 | 4,709 |
| ZN-PP A3 | ZN-PP, Alternative spinneret | 245 | 250 | 189 | 1.3 | 10.0 | 6.8 | 0.007 | 452 | 4,526 |
| m-PP A1 | m-PP (30), Alternative spinneret | 245 | 250 | 189 | 1.3 | 16.8 | 10.3 | 0.006 | 277 | 4,669 |
| m-PP A2 | m-PP (30), Alternative spinneret | 245 | 250 | 189 | 1.3 | 11.8 | 7.2 | 0.006 | 366 | 4,334 |
| m-PP A3 | m-PP (30), Alternative spinneret | 245 | 250 | 189 | 1.3 | 10.1 | 5.7 | 0.006 | 438 | 4,438 |
| m-PP A4 | m-PP (30), Alternative spinneret | 245 | 250 | 134 | 1.1 | 17.0 | 13.6 | 0.008 | 233 | 3,968 |
| m-PP A5 | m-PP (30), Alternative spinneret | 245 | 250 | 134 | 1.1 | 12.1 | 8.1 | 0.007 | 319 | 3,840 |
| m-PP A6 | m-PP (30), Alternative spinneret | 245 | 250 | 134 | 1.1 | 10.1 | 7.3 | 0.007 | 364 | 3,665 |
| m-PP A7 | m-PP (30), Alternative spinneret | 245 | 250 | 134 | 1.1 | 8.0 | 6.4 | 0.008 | 457 | 3,653 |
| m-PP A8 | m-PP (30), Alternative spinneret | 245 | 250 | 134 | 1.0 | 7.2 | 5.2 | 0.007 | 500 | 3,617 |

Column 11,
Line 3, "titer 1.6 dtex" should read --titer < 1.6 dtex--.
Line 5, "basis weight 18 g/m²" should read --basis weight ≤ 18 g/m²--.
Lines 9 and 10, "air permeability, basis weight product is 5000 g/(m · min)" should read --air permeability · basis weight product is ≤5000 g/(m · min)--.
Line 11, ">0.004 m³/g" should read --≥0.004 m³/g--.